(12) United States Patent
Lysy et al.

(10) Patent No.: US 12,072,033 B2
(45) Date of Patent: Aug. 27, 2024

(54) PRESSURE BALANCE VALVE WITH REVERSIBLE CHECK STOPS

(71) Applicant: Oatey Co., Cleveland, OH (US)

(72) Inventors: Karel Lysy, Verdun (CA); Gerald Wolford, Montreal-Nord (CA); Marc Fortin, Montreal (CA)

(73) Assignee: Oatey Co., Cleveland, OH (US)

( * ) Notice: Subject to any disclaimer, the term of this patent is extended or adjusted under 35 U.S.C. 154(b) by 244 days.

(21) Appl. No.: 17/541,657

(22) Filed: Dec. 3, 2021

(65) Prior Publication Data

US 2023/0175605 A1 Jun. 8, 2023

(51) Int. Cl.
*F16K 17/18* (2006.01)
*F16K 27/02* (2006.01)

(52) U.S. Cl.
CPC .......... *F16K 17/18* (2013.01); *F16K 27/0209* (2013.01)

(58) Field of Classification Search
CPC .............................. F16K 17/18; F16K 27/0209
See application file for complete search history.

(56) References Cited

U.S. PATENT DOCUMENTS

2009/0230200 A1* 9/2009 Kempf ..................... E03B 7/09
137/337
2014/0291808 A1* 10/2014 Schneider ........... H01L 29/0603
438/380

* cited by examiner

*Primary Examiner* — P. Macade Nichols
(74) *Attorney, Agent, or Firm* — Alix, Yale & Ristas, LLP

(57) ABSTRACT

Disclosed herein is a valve assembly. The valve assembly includes a valve body, a cartridge, a hot side check stop, and a cold side check stop. The valve body has a cartridge receiving area, a first check stop receiving area, and a second check stop receiving area. The cartridge is located in the cartridge receiving area. The hot side check stop is located in the first check stop receiving area when the valve assembly is in a first configuration. The cold side check stop is located in the second check stop receiving area when the valve assembly is in the first configuration. When the valve assembly is in a second configuration, the hot side check stop is located in the second check stop receiving area and the cold side check stop is located in the first check stop receiving area.

20 Claims, 15 Drawing Sheets

PRESSURE BALANCE VALVE WITH REVERSIBLE CHECK STOPS

TECHNICAL FIELD

This disclosure relates generally to a pressure balance valve, and more particularly to configurations for installations of back-to-back pressure balance valves having hot side and cold side check stops.

BACKGROUND

Pressure balance valves are generally used in showers and are used to provide a steady hot/cold water mix ratio regardless of the changing pressure in the supply lines. These valves are typically mounted inside the wall of a multi-unit housing structure or building (such as an apartment building, for example) which have showers for separate units on both sides of a shared wall. The hot/cold water lines that are plumbed into the wall cavity generally have one hot water line and one cold water line for both of the units. This results in the pressure balance valve on one side of the wall having the hot/cold water lines connected properly, but the pressure balance valve on the other side of the wall needs the hot/cold water lines be reversed in order to connect to the correct side of the valve. This creates a more complex installation for the builder/plumber.

Accordingly, there is a need to provide an improved valve having a configuration that can accommodate the proper hot/cold water connections in any orientation without having to install additional plumbing.

SUMMARY

According to a first aspect of the present disclosure, a valve assembly is disclosed. The valve assembly includes a valve body, a cartridge, a hot side check stop, and a cold side check stop. The valve body has a cartridge receiving area, a first check stop receiving area, and a second check stop receiving area. The cartridge is located in the cartridge receiving area. The hot side check stop is located in the first check stop receiving area when the valve assembly is in a first configuration. The cold side check stop is located in the second check stop receiving area when the valve assembly is in the first configuration. When the valve assembly is in a second configuration, the hot side check stop is located in the second check stop receiving area and the cold side check stop is located in the first check stop receiving area.

According to a second aspect of the present disclosure, a valve body is disclosed. The valve body includes a first inlet, a second inlet, a cartridge receiving area, an outlet passage, a first check stop receiving area, a second check stop receiving area, a first internal passage, and a second internal passage. The first inlet is at a first lateral side of the valve body. The second inlet is at a second lateral side of the valve body. The cartridge receiving area is between the first lateral side and the second lateral side. The outlet passage is between the first lateral side and the second lateral side. The outlet passage is opposite the cartridge receiving area. The first check stop receiving area is proximate the first inlet. The second check stop receiving area is proximate the second inlet. The first internal passage is connected to the first check stop receiving area and the second check stop receiving area. The second internal passage is connected to the first check stop receiving area and the second check stop receiving area.

According to a third aspect of the present disclosure, a valve body is disclosed. The valve body includes a first inlet, a second inlet, a cartridge receiving area, an outlet passage, a first check stop receiving area, a second check stop receiving area, and first and second internal passages. The first inlet is at a first lateral side of the valve body. The second inlet is at a second lateral side of the valve body. The cartridge receiving area is between the first lateral side and the second lateral side. The outlet passage is between the first lateral side and the second lateral side, wherein the outlet passage is opposite the cartridge receiving area. The first check stop receiving is area proximate the first inlet. The second check stop receiving area is proximate the second inlet. The first internal passage comprises a first portion, a second portion, and a first stub channel. The second internal passage comprises a first portion, a second portion, and a second stub channel. The second stub channel is longer than the first stub channel.

DETAILED DESCRIPTION

Figure 1:
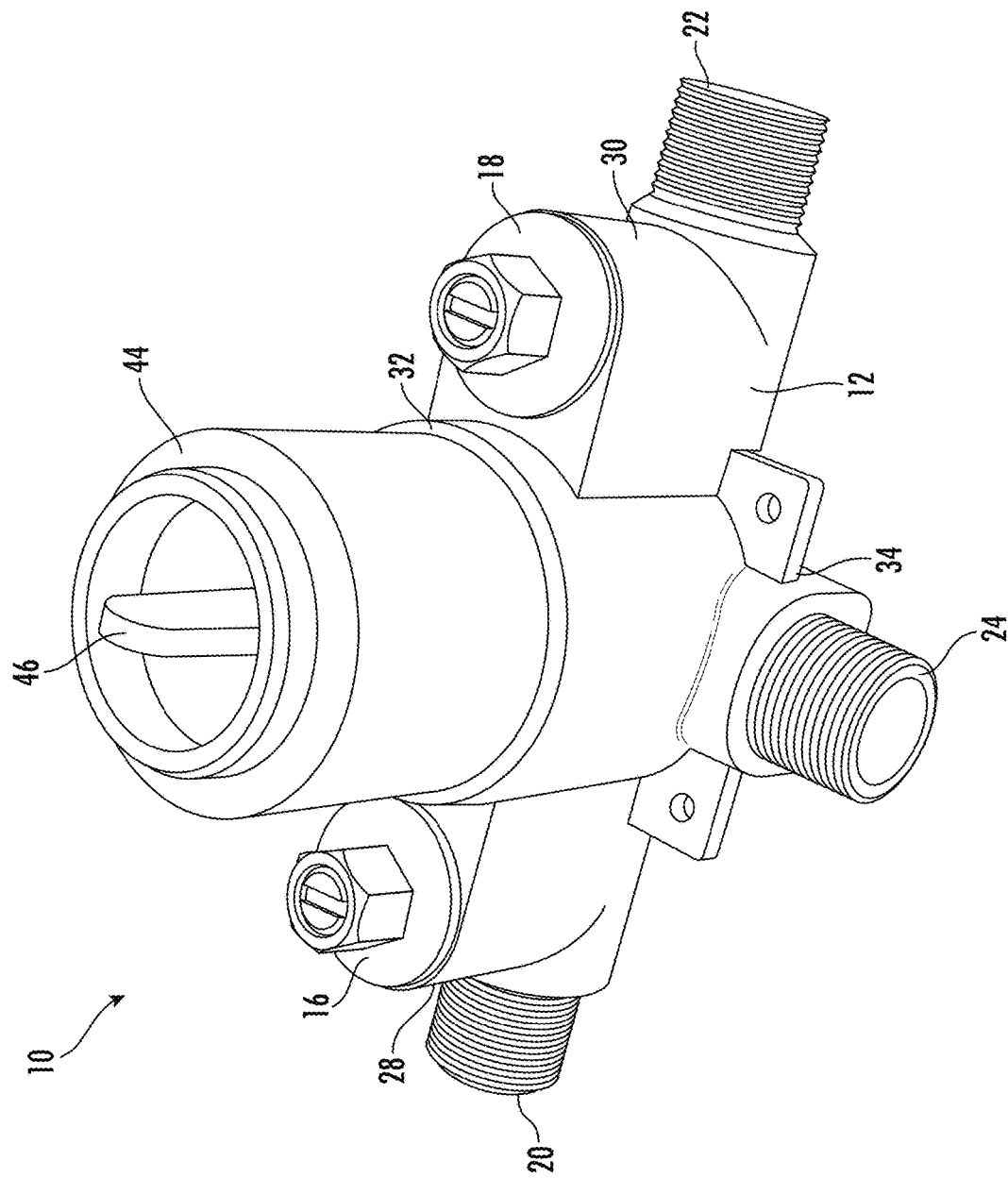
FIG. 1 is a perspective view of a valve assembly (with test plug installed) incorporating features of the disclosure.

Referring to FIG. 1, there is shown a perspective view of a pressure balance valve 10 incorporating features of the various exemplary embodiments. Although the pressure balance valve 10 will be described with reference to the exemplary embodiment(s) shown in the drawings, it should be understood that the pressure balance valve 10 can be embodied in many alternate forms of embodiments. In addition, any suitable size, shape or type of elements or materials could be used.

Figure 2:
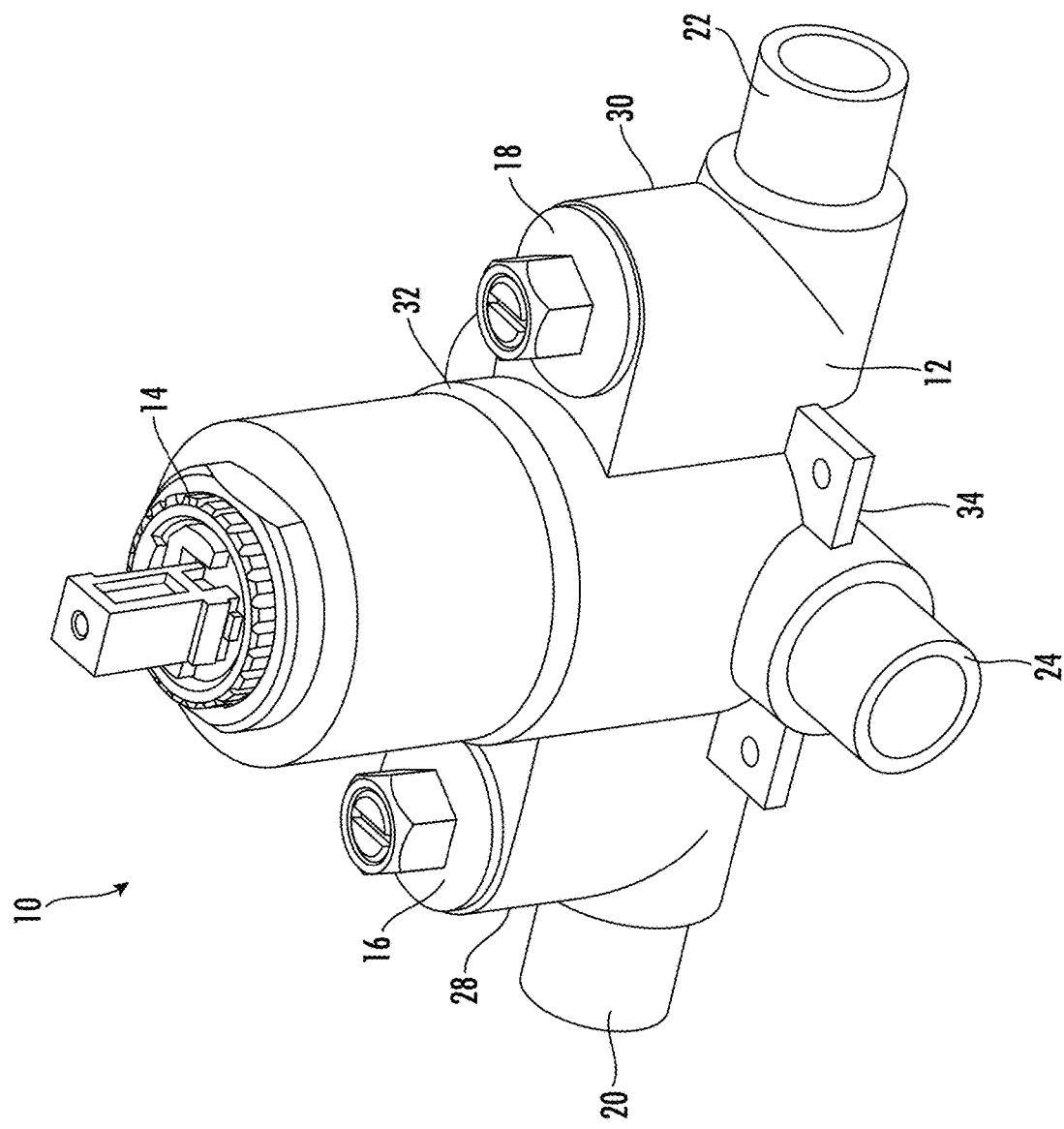
FIG. 2 is another perspective view of the valve assembly (with cartridge installed) shown in FIG. 1.
Figure 3A:
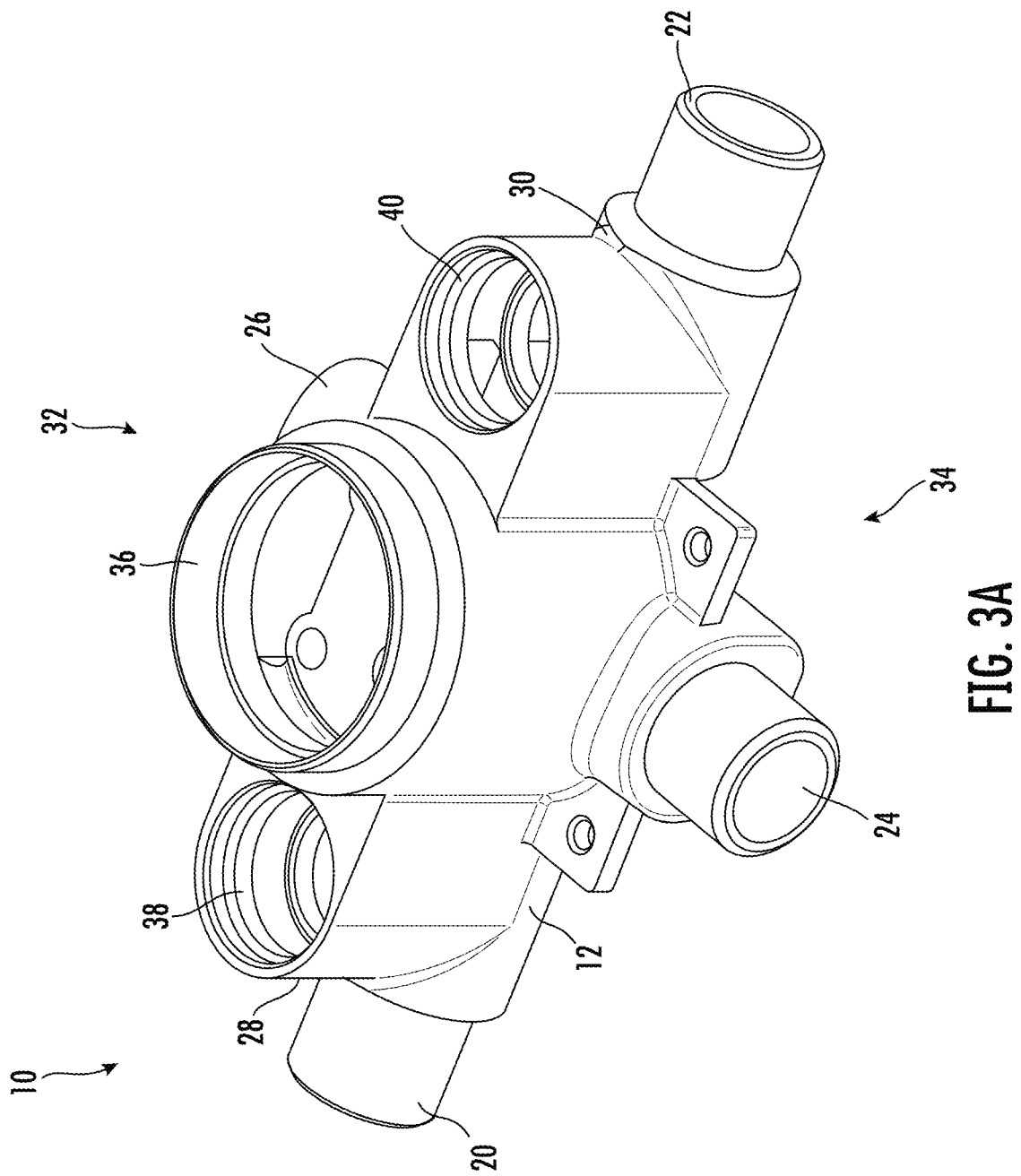
FIG. 3A is a perspective view of a valve body of the valve assembly shown in FIG. 1.
Figure 3B:
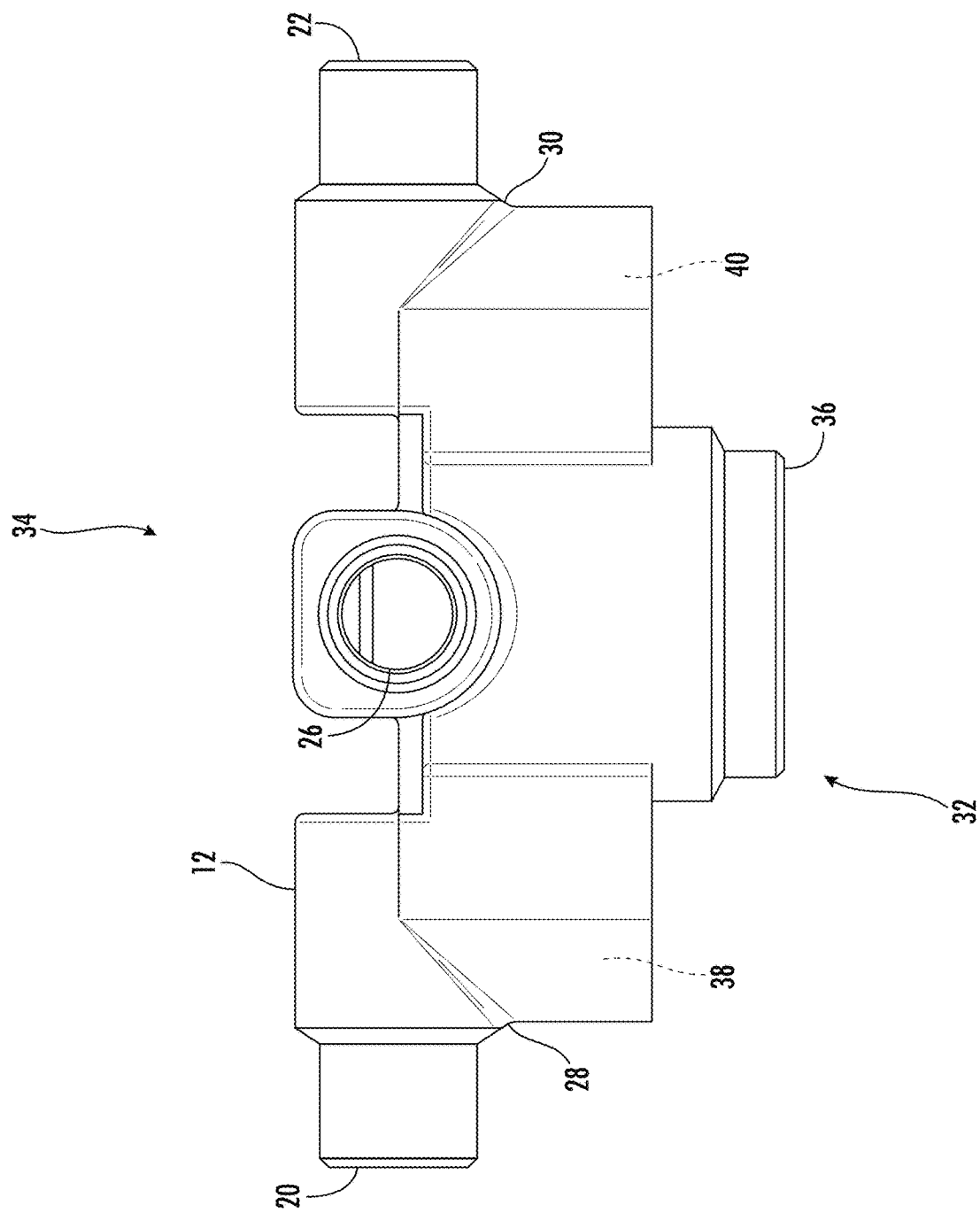
FIG. 3B is a top side view of the valve body shown in FIG. 3A.
Figure 3C:
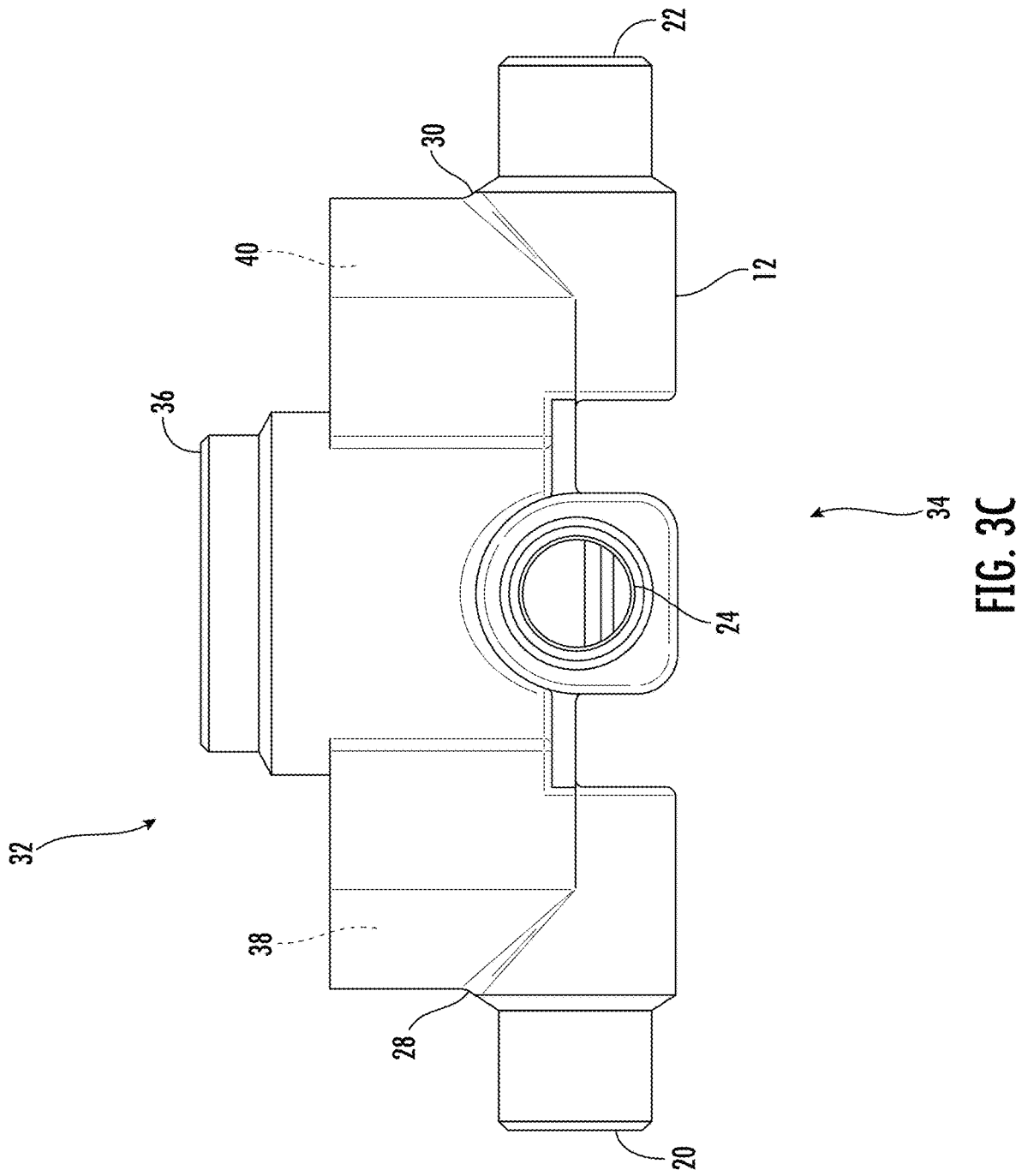
FIG. 3C is a bottom side view of the valve body shown in FIG. 3A.
Figure 3D:
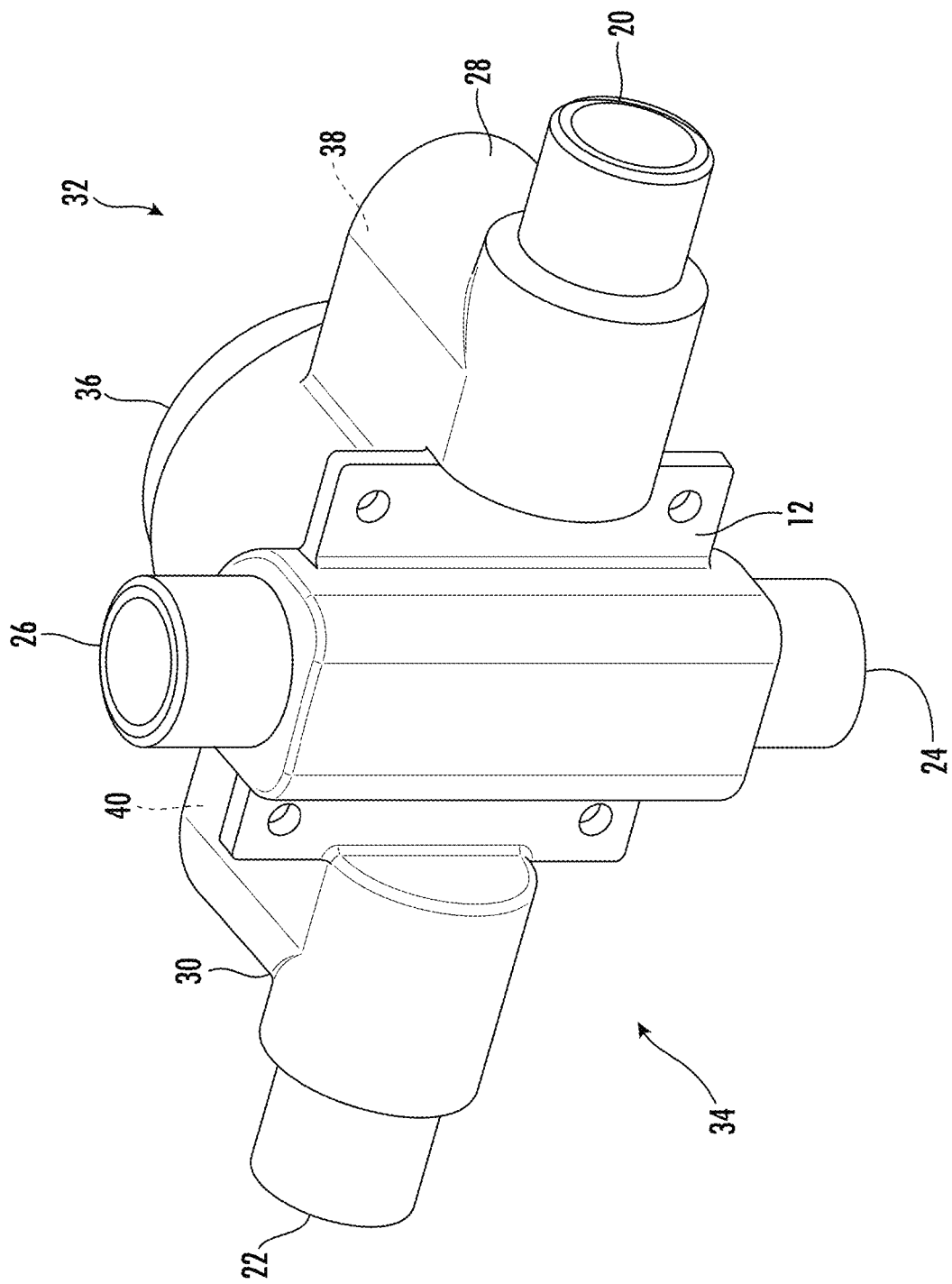
FIG. 3D is a back side perspective view of the valve body shown in FIG. 3A.

Referring now also to FIG. 2, the pressure balance valve 10 comprises a valve body 12, a pressure balance cartridge 14, a hot side check stop 16, and a cold side check stop 18. The valve body 12 may be fabricated from any suitable material (such as brass, for example) and is configured to removably receive the pressure balance cartridge 14, the hot side check stop 16, and the cold side check stop 18. The valve body 12 comprises a first inlet 20, a second inlet 22, a first outlet 24, and a second outlet 26 (see FIGS. 5, 6). The first inlet 20 extends from a first lateral side 28 of the valve body 12, and the second inlet 22 extends from an opposing second lateral side 30 of the valve body 12.

The cartridge 14, which may be any suitable off the shelf pressure balance cartridge, such as a pressure balance volume control (ceramic disc) cartridge, for example, extends from a front side 32 of the valve body 12, and the outlets 24, 26, are positioned between the lateral sides 28, 30, and opposite the cartridge 14 such that the outlets 24, 26, are proximate a back side 34 of the valve body 12. The valve body 12 further comprises a cartridge receiving area 36, a first check stop receiving area 38, and a second check stop receiving area 40 (see FIGS. 3A-3D, 4A-4C). The cartridge receiving area 36 is an aperture formed into the body 12, wherein the aperture is configured to receive the pressure balance cartridge 14 therein. The aperture defining the cartridge receiving area 36 includes an opening thereto. The first and second check stop receiving areas 36, 38 are positioned adjacent to opposing sides of the cartridge receiving area 36. Each of the first and second check stop receiving areas 36, 38 includes an opening to a cavity formed into the body 12, wherein the cavities of the first and second check stop receiving areas 36, 38 are configured to receive the hot and cold side check stops 16, 18 therein. The openings to the first and second check stop receiving areas 36, 38 are oriented in the same direction as the opening of the cartridge receiving area 36. In an embodiment, the cartridge receiving area 36, the first check stop receiving area 38, and the second check stop receiving area 40 removably receive the pressure balance cartridge 14, the hot side check stop 16, and the cold side check stop 18, respectively. In another embodiment, the cartridge receiving area 36, the first check stop receiving area 38, and the second check stop receiving area 40 removably receive the pressure balance cartridge 14, the cold side check stop 18, and the hot side check stop 16, respectively.

Figure 5:
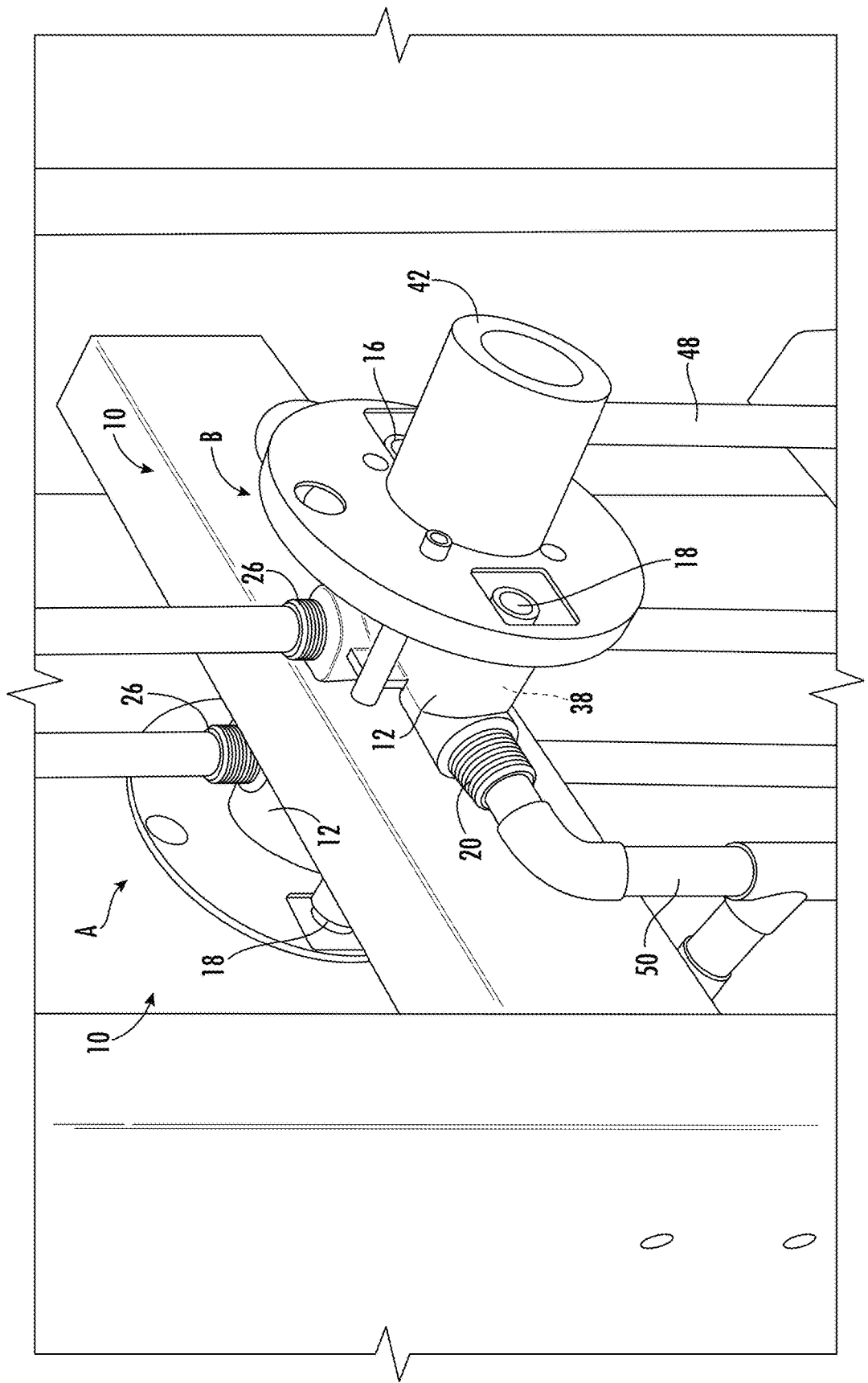
FIG. 5 is a perspective view of a back-to-back installation of valve assemblies as shown in FIG. 1.
Figure 6:
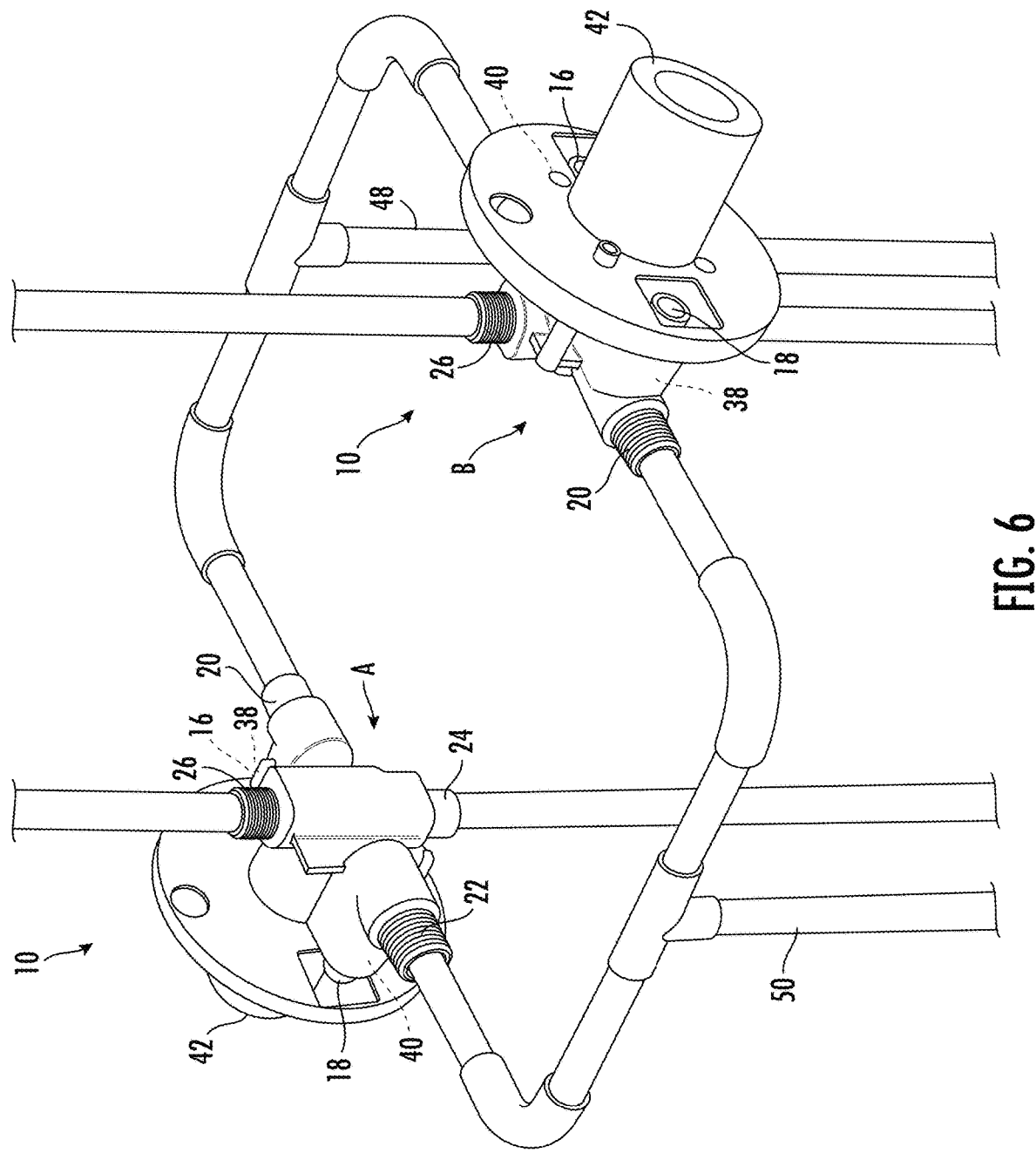
FIG. 6 is another perspective view of a back-to-back installation of valve assemblies as shown in FIG. 1.

Referring now also to FIGS. 5 and 6, there are shown back-to-back installations of two pressure balance valves 10 as in a shared wall between two bathroom showers. Each one of the pressure balance valves 10 is shown with a plastic guard 42 over a cartridge retaining sleeve 44 (shown in FIG. 1) of the pressure balance valve 10. For the initial installation, the pressure balance valve 10 is supplied as a rough and trim configuration wherein a test plug 46 [in place of the cartridge 14] (as shown in FIG. 1) and the plastic guard/cover 42 [over the sleeve 44] are provided. The test plug 46 allows for full (in-wall) field testing of the pressure balance valve 10, and the plastic guard 42 protects the pressure balance valve 10 components (such as the sleeve 44) and serves as an installation guide. After the initial installation, the guard 42 is removed, and after the field testing is completed, the test plug 46 is replaced with the cartridge 14. The field testing is done to ensure there are no leaks in the finished plumbing.

Various exemplary embodiments provide an improved installation configuration which requires less plumbing when compared to conventional configurations. For example, many conventional pressure balance valves are configured such that one of the inlets is only for hot water and the other inlet is only for cold water. With back-to-back installations, conventional pressure balance valves require additional plumbing lines when compared to the configuration shown in FIGS. 5, 6. In particular, conventional pressure balance valves require hot water lines to be plumbed to both inlet sides of back-to-back pressure balance valve installations, and cold water lines to be plumbed to both sides of the back-to-back pressure balance valve installations (as opposed to the single hot water line 48 on one side of the pressure balance valves 10 and the single cold water line 50 on the other side of the pressure balance valves 10 [see FIGS. 5, 6]). Hot and cold water supply lines on both sides of a back-to-back installation are required with conventional valves since the hot water supply line on one side of the valve results in the hot water supply on the opposite side of the other valve of the back-to back installation, similarly this results in the 'reversed' configuration for the cold water supply line as well. According to the various exemplary embodiments, back-to-back installation using the pressure balance valve 10 does not require any additional re-plumbing in order to get the hot/cold in the "correct" orientation, as the valve 10 can be installed with the hot/cold water supply lines being plumbed in any configuration while the valve 10 will always have the proper hot/cold water output due to the interchangeability of the hot/cold check stops.

As shown in FIGS. 5 and 6, installation A includes the hot side check stop 16 located in the first check stop receiving area 38, and the cold side check stop 18 located in the second check stop receiving area 40. Installation B includes the check stops in the 'reversed' configuration wherein the hot side check stop 16 is located in the second check stop receiving area 40, and the cold side check stop 18 is located in the first check stop receiving area 38. This 'reversible' configuration of the check stops allows for proper distribution of hot and cold water within the pressure balance valve 10, as a single hot water supply line 48 connects to one side of the pressure balance valves, and a single cold water supply line 50 connects to the other side of the pressure balance valves.

Each one of the check stops 16, 18 are configured to be 'reversible', wherein the overall outer dimensions of each of the reversible check stops 16, 18 is substantially the same which allows both the first and second check stops 16, 18 to be received within either of the first or second check stop areas 38, 40. The body 52, 62 of the hot and cold side check stops 16, 18 can be formed of brass, aluminum, copper, hardened plastic, or any other material that is durable enough to withstand the stop/start of water flow as well as handle wide swings of water temperatures flowing therethrough.

Figure 7:
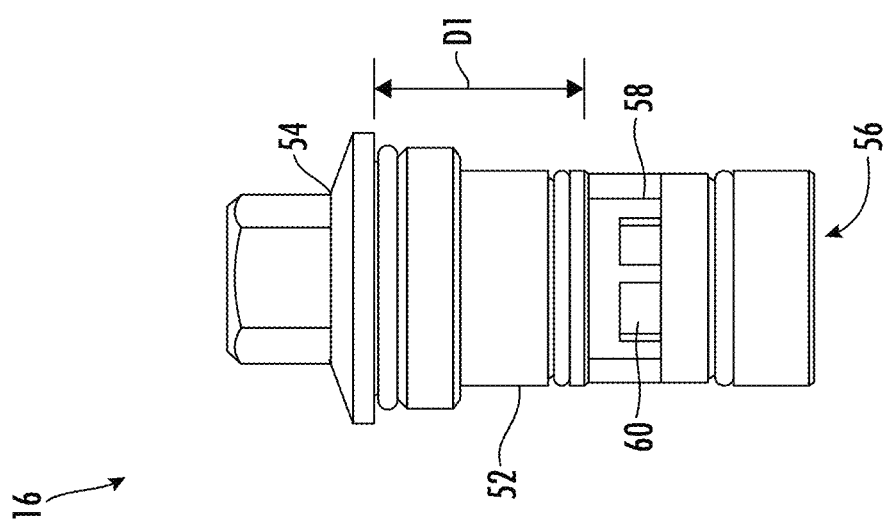
FIG. 7 is a front view of a hot side check stop used in the valve assembly shown in FIG. 1.

The hot side check stop 16 comprises a body 52 having a head portion 54, a first opening 56 and a second opening 58 (see FIG. 7). The body 52 has a generally tubular shape. The first opening 56 is located at the lower distal end of the body 52 and the head portion 54 is located at the opposing upper distal end of the body 52. The second opening 58 is formed through the sidewall of the body 52 between the head portion 54 and the first opening 56. The second opening 58 is spaced apart from the head portion 54 at a first distance D1. According to various exemplary embodiments, the hot side check stop may further comprise a flow regulator 60 housed within the body 52 and positioned adjacent to or within the second opening 58. The flow regulator 60 can be a check valve, water stop, or any other suitable component configured to regulate flow through the check stop. Additionally, in some embodiments the flow regulator 60 may be a NEOPERL™ check valve. The flow regulator 60 is configured to allow water to flow only one way through the hot side check stop 16. In particular, the flow regulator 60 remains open when water is flowing from the first opening 56 and exiting through the second opening 58, but the flow regulator 60 closes to prevent a backflow of water from the second opening 58 to the first opening 56.

Figure 8:
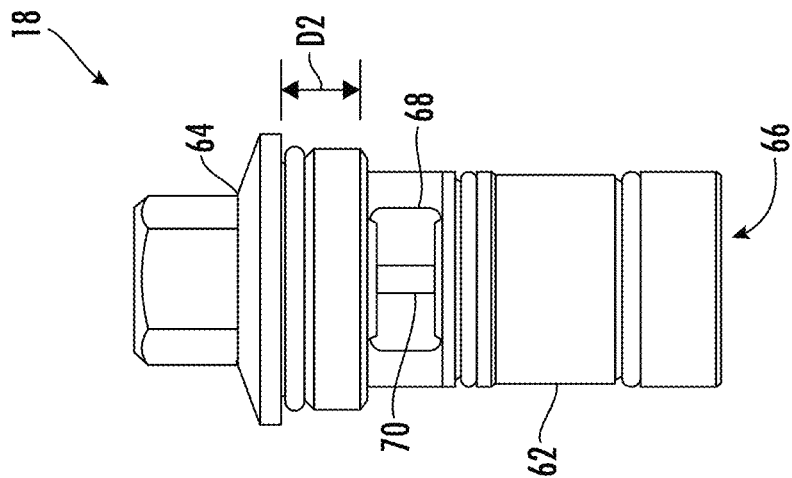
FIG. 8 is a front view of a cold side check stop used in the valve assembly shown in FIG. 1.

Similarly, the cold side check stop 18 comprises a body 62 having a head portion 64, a first opening 66 and a second opening 68 (see FIG. 8). The body 62 has a generally tubular shape. The first opening 66 is located at the distal end of the body 62 opposite the head portion 64, and the second opening 68 is formed through the sidewall of the body 62 between the head portion 64 and the first opening 66. The second opening 68 is spaced apart from the head portion 64 at a second distance D2. According to various exemplary embodiments, the cold side check stop may further comprise a flow regulator 70 located within the body 62 and positioned adjacent to or within the second opening 68. The flow regulator can be a check valve, water stop, or any other suitable component configured to regulate flow through the check stop. Additionally, in some embodiments the flow regulator 70 may be a service stop, however in other alternate embodiments any suitable water stop or flow control component may be provided. The flow regulator 70 is configured to allow water to flow only one way through the cold side check stop 18. In particular, the flow regulator 70 remains open when water is flowing from the first opening 66 and exiting through the second opening 68, but the flow regulator 70 closes to prevent a backflow of water from the second opening 68 to the first opening 66.

In the embodiments of the hot and cold side check stops 16, 18 illustrated in FIGS. 7-8, the first distance D1 is different than the second distance D2. In some embodiments, the first distance D1 is larger than the second distance D2. In other embodiments, the first distance D1 is smaller than the second distance D2. It is important to recognize that the first and second distances D1, D2 must be different in order for the valve 10 to properly distribute hot and cold water therewithin while allowing the hot and cold side check stops 16, 18 to be interchangeable between the first and second check stop areas 38, 40. This difference in the first and second distances D1, D2 of the second opening allows for fluid communication through the check stop to corresponding internal passages of the valve body 12, as will be discussed below. Additionally, the head portions 54, 64, may be color coded (red for hot and blue for cold) for ease of identification.

Figure 4A:
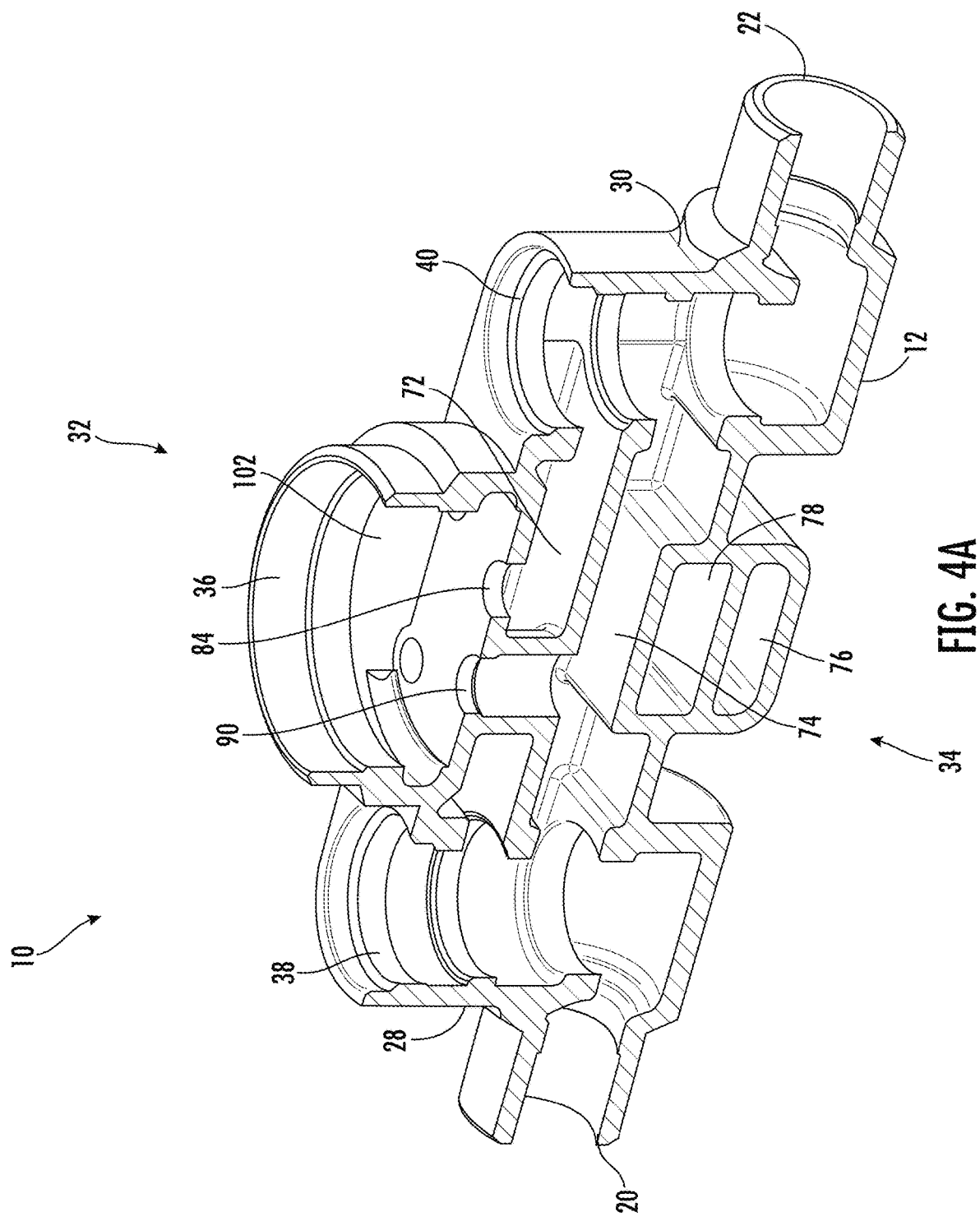
FIG. 4A is a front side section view of the valve body shown in FIG. 3A.
Figure 4B:
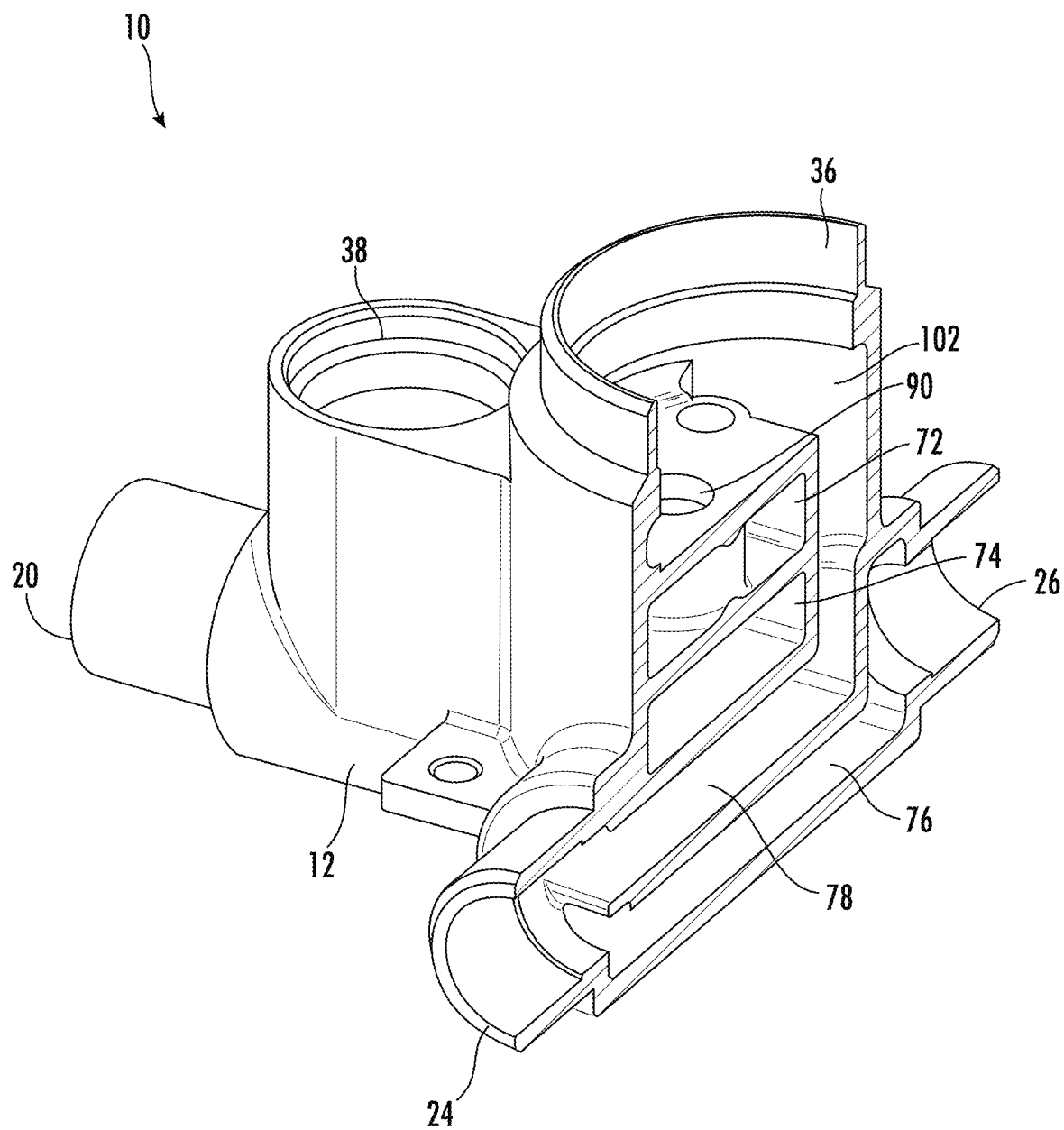
FIG. 4B is a perspective side section view of the valve body shown in FIG. 3A.
Figure 4C:
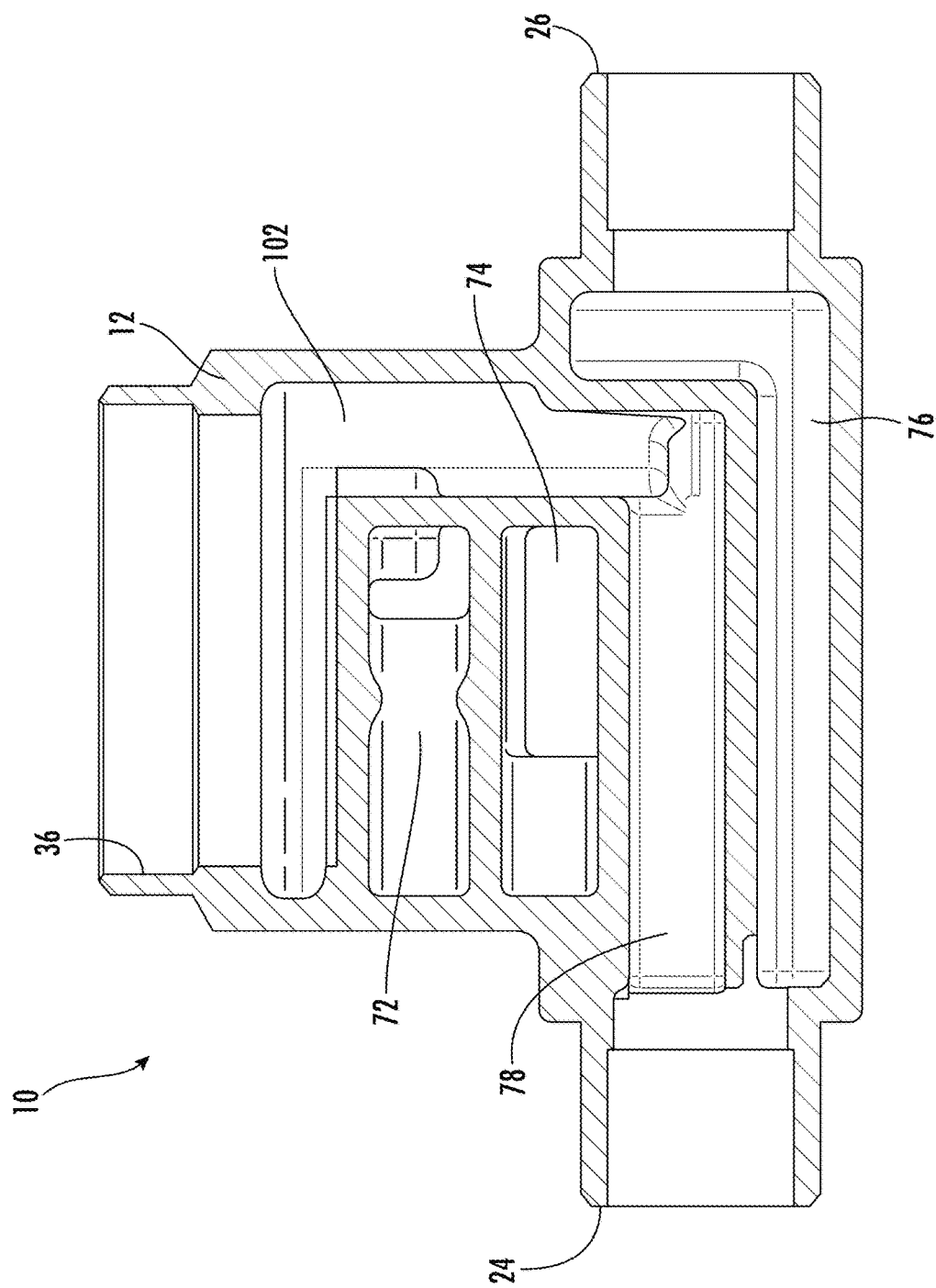
FIG. 4C is a side section view of the valve body shown in FIG. 3A.
Figure 9:
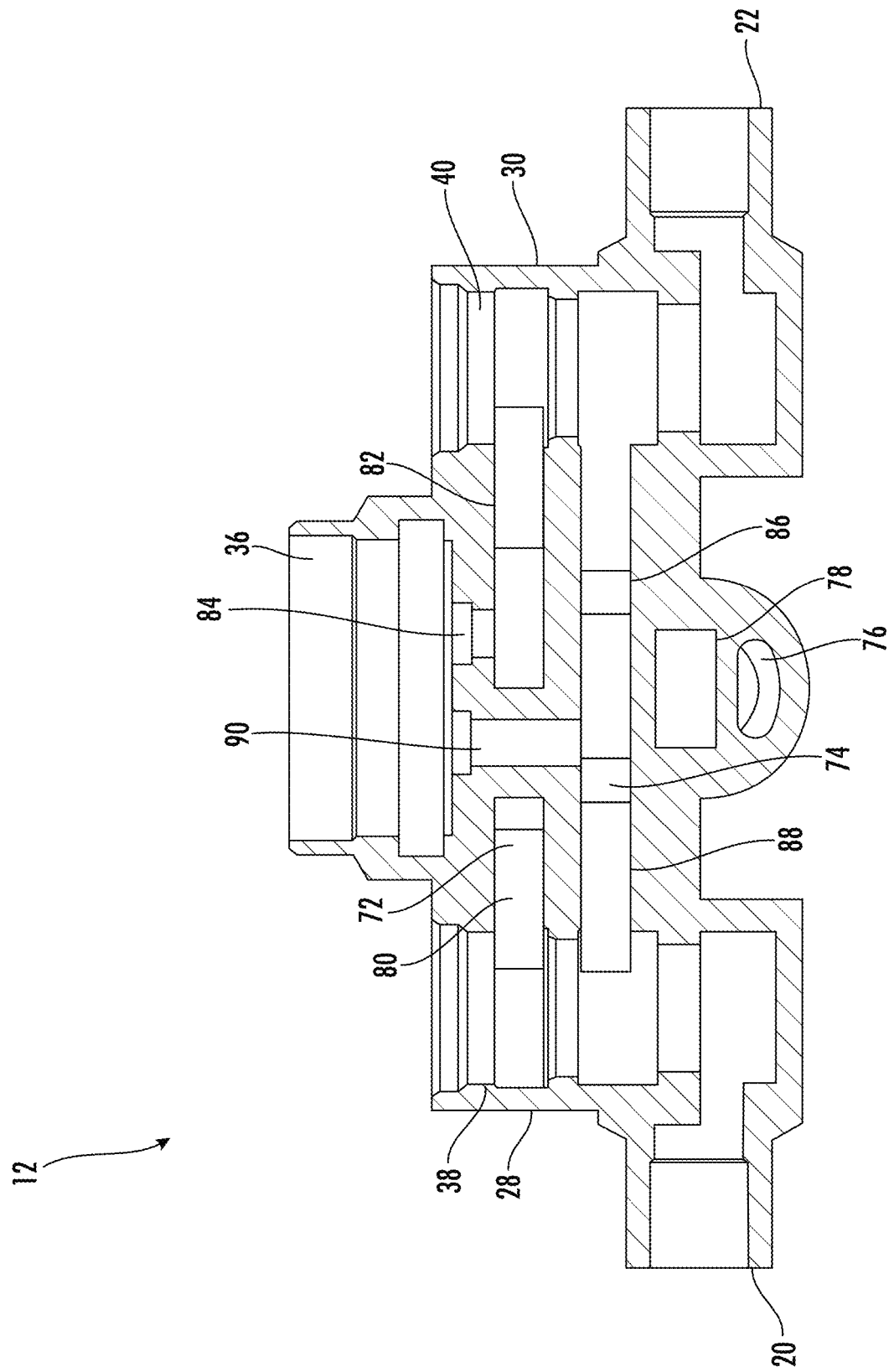
FIG. 9 is a section view of the valve body shown in FIG. 3A.
Figure 10:
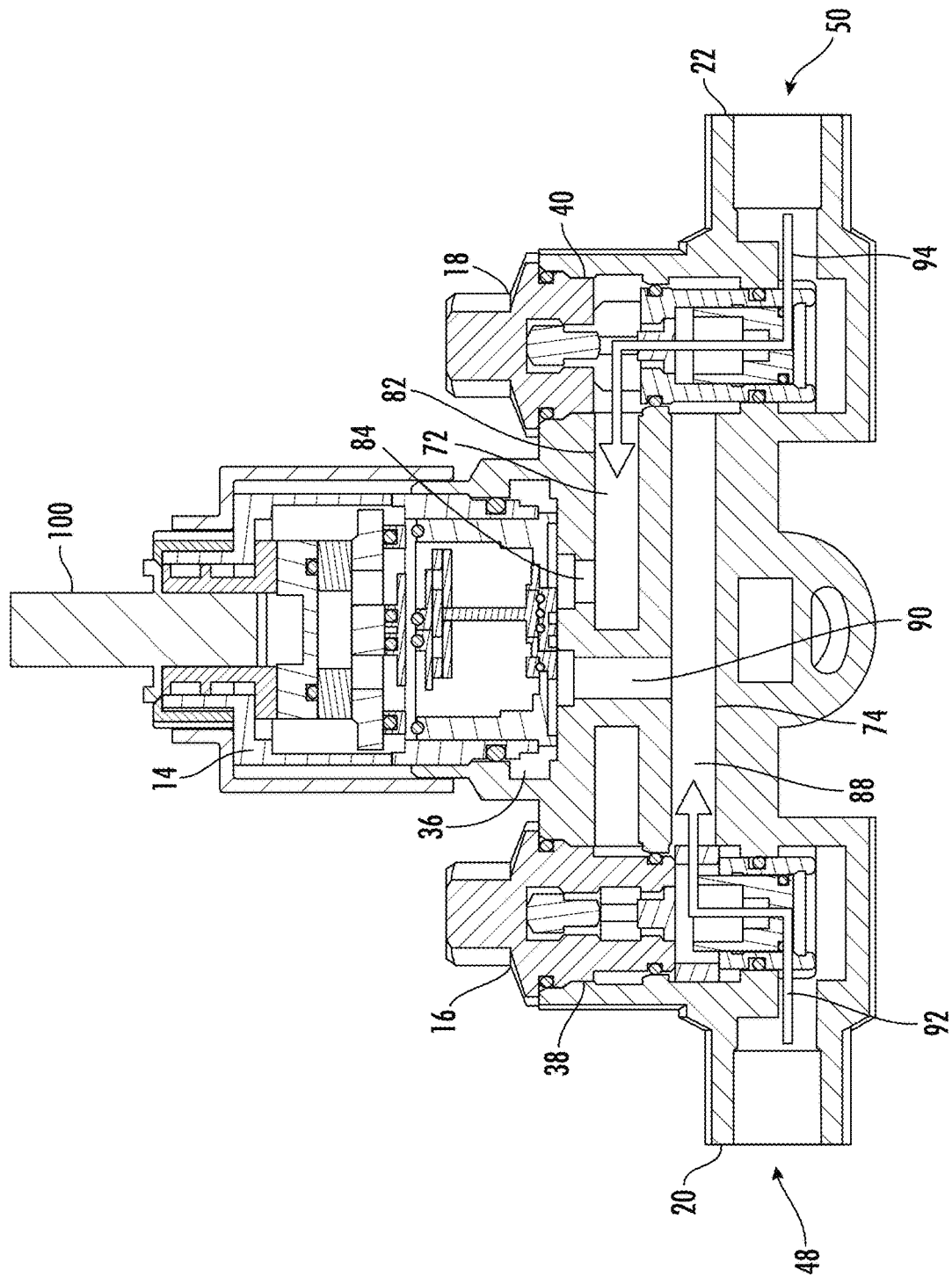
FIG. 10 is a section view of the valve assembly shown in FIG. 1 in a first configuration.
Figure 11:
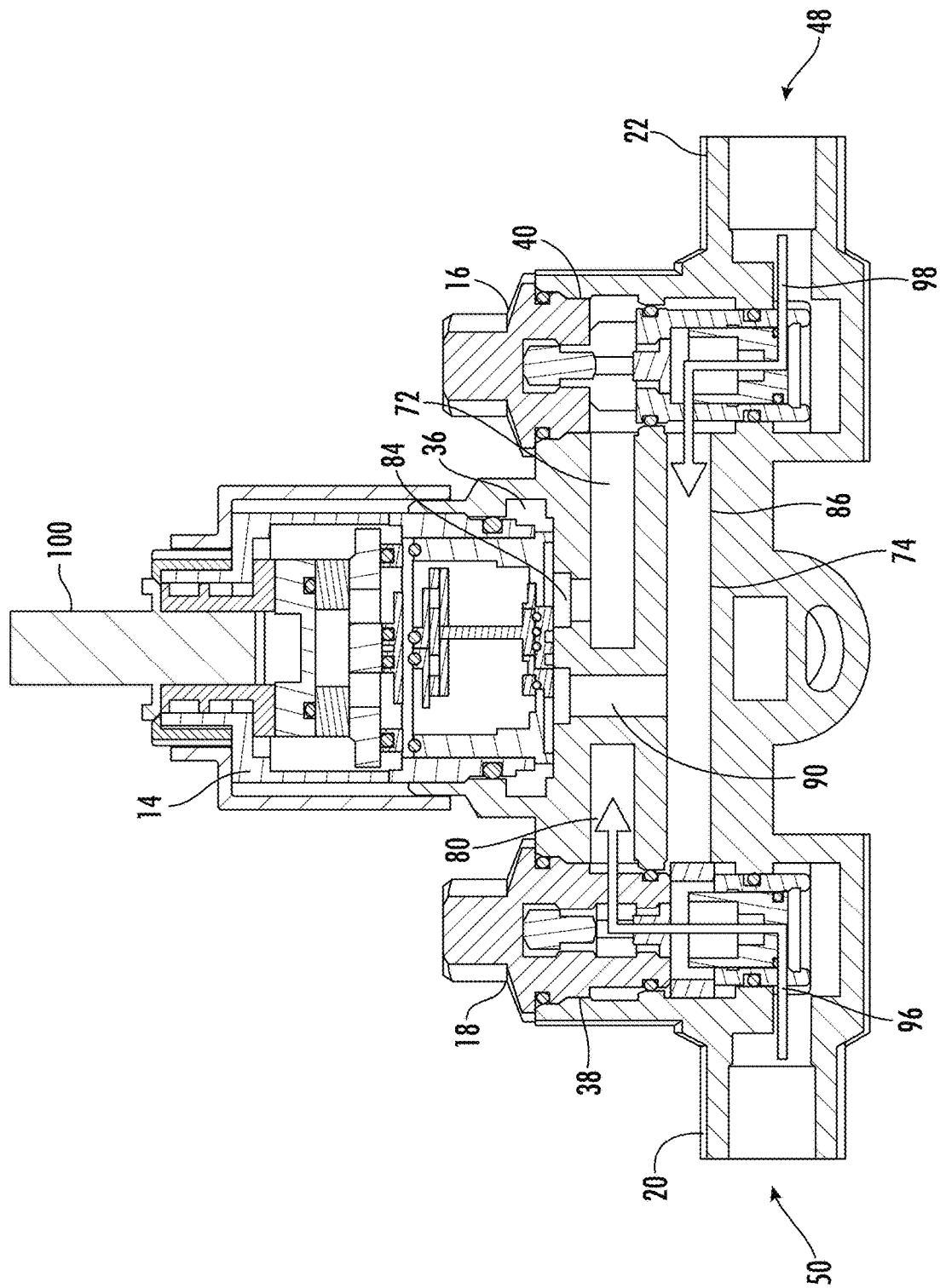
FIG. 11 is a section view of the valve assembly shown in FIG. 1 in a second configuration.

Referring now also to FIGS. 9-11, the valve body 12 comprises a first internal passage 72, a second internal passage 74, and outlet passages 76, 78 of the first and second outlets 24, 26 (see also FIGS. 4A-4C). The first internal passage 72 is fluidly connected to both the first check stop receiving area 38 and the second check stop receiving area 40. The second internal passage 74 is fluidly connected to both the first check stop receiving area 38 and the second check stop receiving area 40. The outlet passage 78 is fluidly connected to and extends between the outlet 24 and the intermediate passage 102 (shown in FIGS. 4A-4C), and the outlet passage 76 is fluidly connected to and extends between the outlet 26 and the intermediate passage 102 (shown in FIGS. 4A-4C). The outlet passages 76, 78 are located between the first lateral side and the second lateral side, wherein the outlets 24, 26 (and outlet passages 76, 78) are opposite the cartridge receiving area 36. Additionally, the first internal passage 72 comprises a first portion 80, a second portion 82, and a first stub channel 84, wherein the first and second portions 82 and the first stub channel 84 are fluidly connected together. In the illustrated embodiment, the second stub channel 90 is longer than the first stub channel 84. The first portion 80 of the first internal passage 72 includes an opening into the cavity of the first check stop receiving area 38, and the second portion 82 of the first internal passage 72 includes an opening into the cavity of the second check stop receiving area 40. The first stub channel 84 extends between and fluidly connects the second portion 82 of the first internal passage 72 and the cartridge receiving area 36. The second internal passage 74 comprises a first portion 86, a second portion 88, and second stub channel 84, wherein the first and second portions 86, 88 and the second stub channel 90 are fluidly connected together. The first portion 86 of the second internal passage 74 includes an opening into the cavity of the second check stop receiving area 40, and the second portion 88 of the second internal passage 74 includes an opening into the cavity of the second check stop receiving area 38. The second stub channel 90 extends between and fluidly connects the second portion 88 of the second internal passage 74 and the cartridge receiving area 36. The first and second internal passages 72, 74 are illustrated as being substantially planar passages as they extend laterally through the body 12 between the first and second check stop receiving areas 38, 40. In the illustrated embodiment, the first internal passage 72 is located closer to the cartridge receiving area 36 than the second internal passage 74. As a result, the first internal passage 72 intersects the first and second check stop receiving areas 38, 40 such that the openings at the intersection are closer to the opening of the first and second check stop receiving areas 38, 40 than the openings at the intersection of the second internal passage 74 and the first and second check stop receiving areas 38, 40.

When the valve 10 is installed in the installation A configuration, the hot water supply line 48 is connected to the first inlet 20, the cold water supply line 50 is connected to the second inlet 22, the hot side check stop 16 is in the first check stop receiving area 38, and the cold side check stop 18 is in the second check stop receiving area 40 (see FIG. 10). The supply of hot water enters the body 12 of the valve 10 through the first inlet 20, then enters the hot side check stop 16 located in the first check stop receiving area 38 through the first opening 56 at the lower distal end thereof. The supply of hot water then flows through the hot side check stop 16 and exits through the second opening 58 and into the second portion 88 of the second internal passage 74. The supply of hot water then flows through the second internal passage 74, through the second stub channel 90, and into the cartridge 14 located in the cartridge receiving area 36, as illustrated by the 'red' flow path and arrow 92). The supply of cold water enters the body 12 of the valve 10 through the second inlet 22, then enters the cold side check stop 18 located in the second check stop receiving area 40 through the first opening 66 at the lower distal end thereof. The supply of cold water then flows through the cold side check stop 18 and exits through the second opening 68 and into the second portion 82 of the first internal passage 72. The supply of cold water then flows through the first internal passage 72, through the first stub channel 84, and into the cartridge 14 located in the cartridge receiving area 36, as illustrated by the 'blue' flow path and arrow 94.

When the valve 10 is installed in the installation B configuration, the cold water supply line 50 is connected to the first inlet 20, the hot water supply line 48 is connected to the second inlet 22, the cold side check stop 18 is in the first check stop receiving area 38, and the hot side check stop 16 is in the second check stop receiving area 40 (see FIG. 11). The supply of cold water enters the body 12 of the valve 10 through the first inlet 20, then enters the cold side check stop 18 located in the first check stop receiving area 38 through the first opening 66 at the lower distal end thereof. The supply of cold water then flows through the cold side check stop 18 and exits through the second opening 68 and into the first portion 80 of the first internal passage 72. The supply of cold water then flows through the first internal passage 72, through the first stub channel 84, and into the cartridge 14 located in the cartridge receiving area 36, as illustrated by the 'blue' flow path and arrow 96. The supply of hot water enters the body 12 of the valve 10 through the second inlet 22, then enters the hot side check stop 16 located in the second check stop receiving area 40 through the first opening 56 at the lower distal end thereof. The supply of hot water then flows through the hot side check stop 16 and exits through the second opening 58 and into the first portion 86 of the second internal passage 74. The supply of hot water then flows through the second internal passage 74, through the second stub channel 90, and into the cartridge 14 located in the cartridge receiving area 36, as illustrated by the 'red' flow path and arrow 98.

As described above for the installation A, B configurations, the first and second stub channels 84, 90 always supply cold and hot water, respectively, to the cartridge receiving area 36. In particular, the first stub channel 84 always supplies cold water to the cartridge receiving area and the second stub channel 90 always supplies hot water to the cartridge receiving area. This configuration corresponds with the interchangeability of the check stops, the position of which is determined by whether the hot water supply comes into the valve body 12 through either the first or second inlet 20, 22.

With the installation A, B configurations described above, hot and cold water flows through the internal passages of the valve body 12 and to the cartridge 14 located within the cartridge receiving area 36. This allows for mixing of the hot and cold water in the pressure balanced cartridge 14 based on a position of the stem 100 (which rotates in response to a rotation of a shower handle attached to the stem, for example). The cartridge 14 receives the hot and cold water from the second and first stub channels 90, 84, respectively. The hot and cold water flow from the second and first stub channels 90, 84 through interfaces at the cartridge receiving area 36. The hot/cold water exits at another portion of the cartridge 14 which is in fluid communication with intermediate passage 102 (see FIGS. 4A-4C) which are connected to the outlet passage 76, 78. The rotation of the handle (and the stem 100) adjusts the desired temperature of the water within the cartridge and sends corresponding amounts of hot/cold water through intermediate passage 102 which are connected to the outlet passages 76, 78, and to a shower head through outlet 26 and/or a tub faucet through outlet 24.

The pressure balance valve 10 configuration shown in installation A (FIG. 10)—the hot side check stop 16 is installed and positioned within the first check stop receiving area 38 and the cold side check stop 18 is installed and positioned within the second check stop receiving area 40—can be installed in a manner in which it does not matter whether the hot or cold water supply line 48, 50 is connected to the first inlet 20 (and whether the other of the hot or cold water supply line 48, 50 is connected to the second inlet 22). In order to ensure that the supply of hot water flows through the second stub channel 90 and the supply of cold water flows through the first stub channel 84, the installing plumber can selectively remove or insert the proper check stop 16, 18 into the first and second check stop receiving areas 38, 40. For example, if the pressure balance valve 10 is configured as shown in installation A (FIG. 10) but the hot water supply 48 is instead connected to the second inlet 22 and the cold water supply 50 is connected to the first inlet 20, the hot side check stop 16 can be removed by the plumber from the first check stop receiving area 38 and installed into the second check stop receiving area 40 and the cold side check stop 18 can be removed by the plumber from the second check stop receiving area 40 and installed into the first check stop receiving area 38.

The pressure balance valve 10 is configured to allow the hot and cold side check stops 16, 18 to be interchangeably installed into either the first or second check stop receiving areas 38, 40. Accordingly, the valve body 12 can be installed without any check stops 16, 18 located therein, wherein the hot and cold side check stops 16, 18 are selectively installed or switched locations once it is determined into which inlet 20, 22 of the body 12 the hot and cold water supplies 48, 50 are connected.

Technical effects of any one or more of the exemplary embodiments provide a valve and valve housing that receives hot and cold water check stop cartridges (which are specific for hot and cold water), such that the valve housing allows the hot/cold cartridges to be interchangeable/ swapped out (or reversed) to ensure proper hot and cold water mixing is provided to the user regardless of whether the hot/cold supply lines are oriented on the left/right or right/left into the housing, with accommodation of the corresponding check stop cartridge inserted into the housing.

It should be understood that components of the invention can be operationally coupled or connected and that any number or combination of intervening elements can exist (including no intervening elements). The connections can be direct or indirect and additionally there can merely be a functional relationship between components.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, a valve assembly comprising: a valve body having a cartridge receiving area, a first check stop receiving area, and a second check stop receiving area, wherein the cartridge receiving area is spaced between the first check stop receiving area and the second check stop receiving area; a cartridge located in the cartridge receiving area; a hot side check stop located in the first check stop receiving area when the valve assembly is in a first configuration; and a cold side check stop located in the second check stop receiving area when the valve assembly is in the first configuration; wherein when the valve assembly is in a second configuration, the hot side check stop is located in the second check stop receiving area and the cold side check stop is located in the first check stop receiving area.

A valve assembly as above wherein the valve body further comprises a first internal passage and a second internal passage, wherein the first internal passage is connected to the first check stop receiving area and the second check stop receiving area, and wherein the second internal passage is connected to the first check stop receiving area and the second check stop receiving area.

A valve assembly as above wherein the valve body further comprises first and second internal passages, wherein the first internal passage comprises a first portion, a second portion, and a first stub channel, wherein the second internal passage comprises a first portion, a second portion, and a second stub channel, and wherein the second stub channel is longer than the first stub channel.

A valve assembly as above wherein the cartridge is a pressure balance cartridge.

A valve assembly as above wherein the hot side check stop and the cold side check stop each comprise a flow regulator.

A valve assembly as above wherein the hot side check stop comprises a head potion and an opening spaced from the head portion at a first distance, wherein the cold side check stop comprises a head potion and an opening spaced from the head portion at a second distance, wherein the first distance is greater than the second distance.

In another exemplary embodiment, a valve body comprising: a first inlet at a first lateral side of the valve body; a second inlet at a second lateral side of the valve body; a cartridge receiving area between the first lateral side and the second lateral side; an outlet passage between the first lateral side and the second lateral side, wherein the outlet passage is opposite the cartridge receiving area; a first check stop receiving area proximate the first inlet; a second check stop receiving area proximate the second inlet; a first internal passage connected to the first check stop receiving area and the second check stop receiving area; and a second internal passage connected to the first check stop receiving area and the second check stop receiving area.

A valve body as above wherein the first internal passage is between the cartridge receiving area and the second internal passage.

A valve body as above wherein the first check stop receiving area removably receives a first check stop or a second different check stop.

A valve body as above wherein the second check stop receiving area removably receives a first check stop or a second different check stop.

A valve body as above wherein the first internal passage is positioned between the cartridge receiving area and the outlet passage, and wherein the second internal passage is positioned between the first internal passage and the outlet passage.

A valve body as above wherein the first and second internal passages are oriented in a planar manner between the first and second check stop receiving areas.

A valve body as above wherein the first internal passage comprises a first portion, a second portion, and a first stub channel, wherein the second internal passage comprises a first portion, a second portion, and a second stub channel, and wherein the second stub channel is longer than the first stub channel.

In another exemplary embodiment, a valve body comprising: a first inlet at a first lateral side of the valve body; a second inlet at a second lateral side of the valve body; a cartridge receiving area between the first lateral side and the second lateral side; an outlet passage between the first lateral side and the second lateral side, wherein the outlet passage is opposite the cartridge receiving area; a first check stop receiving area proximate the first inlet; a second check stop receiving area proximate the second inlet; and first and second internal passages, wherein the first internal passage comprises a first portion, a second portion, and a first stub channel, wherein the second internal passage comprises a first portion, a second portion, and a second stub channel, and wherein the second stub channel is longer than the first stub channel.

A valve body as above wherein the first stub channel is connected to the cartridge receiving area.

A valve body as above wherein the second stub channel is connected to the cartridge receiving area.

A valve body as above wherein the first stub channel is between the first portion and the second portion of the first internal passage.

A valve body as above wherein the second stub channel is between the first portion and the second portion of the second internal passage.

A valve body as above wherein the first internal passage is connected to the first check stop receiving area and the second check stop receiving area; and wherein the second internal passage is connected to the first check stop receiving area and the second check stop receiving area.

A valve body as above wherein the first internal passage is between the cartridge receiving area and the outlet passage, and wherein the second internal passage is between the first internal passage and the outlet passage.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A valve assembly comprising:
a valve body having a cartridge receiving area, a first check stop receiving area, and a second check stop receiving area, wherein the cartridge receiving area is spaced between the first check stop receiving area and the second check stop receiving area;
a cartridge located in the cartridge receiving area;
a hot side check stop located in the first check stop receiving area when the valve assembly is in a first configuration; and
a cold side check stop located in the second check stop receiving area when the valve assembly is in the first configuration;
wherein when the valve assembly is in a second configuration, the hot side check stop is located in the second check stop receiving area and the cold side check stop is located in the first check stop receiving area, and
wherein the hot side check stop comprises a head portion and an opening spaced from the head portion at a first distance, wherein the cold side check stop comprises a head portion and an opening spaced from the head portion at a second distance, wherein the first distance is different than the second distance.

2. The valve assembly of claim 1 wherein the valve body further comprises a first internal passage and a second internal passage, wherein the first internal passage is connected to the first check stop receiving area and the second check stop receiving area, and wherein the second internal passage is connected to the first check stop receiving area and the second check stop receiving area.

3. The valve assembly of claim 1 wherein the valve body further comprises first and second internal passages, wherein the first internal passage comprises a first portion, a second portion, and a first stub channel, wherein the second internal passage comprises a first portion, a second portion, and a second stub channel, and wherein the second stub channel is longer than the first stub channel.

4. The valve assembly of claim 1 wherein the cartridge is a pressure balance cartridge.

5. The valve assembly of claim 1 wherein the hot side check stop and the cold side check stop each comprise a flow regulator.

6. A valve body comprising:
a first inlet at a first lateral side of the valve body;
a second inlet at a second lateral side of the valve body;
a cartridge receiving area between the first lateral side and the second lateral side wherein the cartridge receiving area is configured to receive a cartridge, wherein the cartridge is configured to receive a fluid having a first temperature through a first inlet of the cartridge and a fluid having a second temperature through a second inlet of the cartridge, wherein the second inlet of the cartridge is different than the first inlet of the cartridge, and wherein the first temperature is different from the second temperature;
a first check stop receiving area proximate the first inlet;
a second check stop receiving area proximate the second inlet;
a first internal passage connected to the first check stop receiving area, the second check stop receiving area, and the first inlet of the cartridge; and
a second internal passage connected to the first check stop receiving area, the second check stop receiving area, and the second inlet of the cartridge.

7. The valve body of claim 6 wherein the first internal passage is between the cartridge receiving area and the second internal passage.

8. The valve body of claim 6 wherein the first check stop receiving area removably receives a first check stop or a second different check stop.

9. The valve body of claim 6 wherein the second check stop receiving area removably receives a first check stop or a second different check stop.

10. The valve body of claim 6 wherein the first internal passage is positioned between the cartridge receiving area and an outlet passage, wherein the second internal passage is positioned between the first internal passage and the outlet passage, wherein the outlet passage is disposed between the first lateral side and the second lateral side.

11. The valve body of claim 10 wherein the first and second internal passages are oriented in a planar manner between the first and second check stop receiving areas.

12. The valve body of claim 6 wherein the first internal passage comprises a first portion, a second portion, and a first stub channel, wherein the second internal passage comprises a first portion, a second portion, and a second stub channel, and wherein the second stub channel is longer than the first stub channel.

13. A valve assembly comprising:
a valve body having a first inlet at a first lateral side of the valve body and a second inlet at a second lateral side of the valve body;
a cartridge receiving area between the first lateral side and the second lateral side, wherein the cartridge receiving area is configured to receive a cartridge, and wherein the cartridge is configured to receive fluid via a first inlet of the cartridge and to receive fluid via a second inlet of the cartridge, wherein the first inlet of the cartridge is different from the second inlet of the cartridge;
a first check stop receiving area proximate the first inlet, wherein the first check stop receiving area is configured to receive a first check stop in a first configuration of the valve assembly and a second check stop in a second configuration of the valve assembly, wherein the first check stop is different than the second check stop;
a second check stop receiving area proximate the second inlet, wherein the second check stop receiving area is configured to receive the second check stop in the first configuration of the valve assembly and the first check stop in the second configuration of the valve assembly;
wherein the first check stop is configured to control fluid flow between the first inlet of the valve body and the first inlet of the cartridge or between the second inlet of the valve body and the first inlet of the cartridge; and
wherein the second check stop is configured to control fluid flow between the first inlet of the valve body and the second inlet of the cartridge or between the second inlet of the valve body and the second inlet of the cartridge.

14. The valve assembly of claim 13, further comprising:
first and second internal passages, wherein the first internal passage comprises a first portion, a second portion, and a first stub channel, wherein the second internal passage comprises a first portion, a second portion and a second stub channel, and wherein the second stub channel is longer than the first stub channel.

15. The valve assembly of claim 14 wherein the first stub channel is connected to the cartridge receiving area.

16. The valve assembly of claim 14 wherein the second stub channel is connected to the cartridge receiving area.

17. The valve assembly of claim 14 wherein the first stub channel is between the first portion and the second portion of the first internal passage.

18. The valve assembly of claim 14 wherein the second stub channel is between the first portion and the second portion of the second internal passage.

19. The valve assembly of claim 14 wherein the first internal passage is connected to the first check stop receiving area and the second check stop receiving area; and
wherein the second internal passage is connected to the first check stop receiving area and the second check stop receiving area.

20. The valve assembly of claim 14, further comprising:
an outlet passage disposed between the first lateral side and the second lateral side, wherein the first internal passage is between the cartridge receiving area and the outlet passage, and wherein the second internal passage is between the first internal passage and the outlet passage.

* * * * *